United States Patent
Lindblom (10) Patent No.: US 8,429,285 B2
(45) Date of Patent: Apr. 23, 2013

(54) METHOD AND DEVICE FOR DATA TRANSMISSION AND RECEPTION WITH DROPPED STABLE DATA ELEMENTS

(75) Inventor: Jonas Lindblom, Solna (SE)

(73) Assignee: Skype, Dublin (IE)

( * ) Notice: Subject to any disclaimer, the term of this patent is extended or adjusted under 35 U.S.C. 154(b) by 968 days.

(21) Appl. No.: 12/004,523

(22) Filed: Dec. 20, 2007

(65) Prior Publication Data

US 2008/0235389 A1   Sep. 25, 2008

(30) Foreign Application Priority Data

Mar. 20, 2007   (GB) .................................. 0705324.2

(51) Int. Cl.
*G06F 13/00*   (2006.01)

(52) U.S. Cl.
USPC ......................................................... 709/231

(58) Field of Classification Search .................... 709/231
See application file for complete search history.

(56) References Cited

U.S. PATENT DOCUMENTS

| | | | |
|---|---|---|---|
| 2004/0073692 A1 | 4/2004 | Gentle et al. | |
| 2005/0137857 A1 | 6/2005 | Greer | |
| 2006/0100859 A1* | 5/2006 | Jelinek et al. | 704/201 |

FOREIGN PATENT DOCUMENTS

| | | |
|---|---|---|
| CA | 2682153 | 9/2008 |
| CN | 101636786 | 1/2010 |
| EP | 1 982 331 | 8/2007 |
| WO | WO 2005/009019 A2 | 1/2005 |
| WO | WO-2008114085 | 9/2008 |

OTHER PUBLICATIONS

Lindblom, J., "A Sinusoidal Voice Over Packet Coder Tailored for the Frame-Erasure Channel," *IEEE Transactions on Speech and Audio Processing*, 13:5, pp. 787-798 (2005).
Praestholm, S., et al., "Packet Voice Rate Adaptation Through Perceptual Frame Discarding," *IEEE Globecom*, pp. 2497-2502 (2007).
Feb. 18, 2009 Transmittal of International Search Report and Written Opinion of the International Searching Authority, PCT/IB2007/004448.
"Examination Report", EP Application No. 07870470.7, (Dec. 9, 2011), 4 pages.
"Examination Report", EP Application No. 07870470.7, (Dec. 2, 2010), 4 pages.

* cited by examiner

*Primary Examiner* — Robert B Harrell
(74) *Attorney, Agent, or Firm* — Wolfe-SBMC (57) ABSTRACT

A method of transmitting data from a first node to a second node in a communication network includes receiving a signal; dividing the signal into data elements arranged in a first data stream comprising active and inactive data elements; analysing at least one characteristic of the signal to determine if the signal is stable; dropping at least one active data element from a plurality of data elements of the first data stream if it is determined that the portion of the signal included in the plurality of data elements is stable; inputting the data elements that are not dropped from the first data stream into a core stream; and transmitting the core stream from the first node to the second node.

54 Claims, 4 Drawing Sheets

METHOD AND DEVICE FOR DATA TRANSMISSION AND RECEPTION WITH DROPPED STABLE DATA ELEMENTS

RELATED APPLICATION

This application claims priority under 35 U.S.C. §119 or 365 to Great Britain, Application No. 0705324.2, filed Mar. 20, 2007. The entire teachings of the above application are incorporated herein by reference.

TECHNICAL FIELD

The present invention relates to communication systems. More particularly the present invention relates to a method and apparatus for encoding, transmitting and receiving data in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

Each data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes information from the digital signal intended for transmission. This information may be included in the payload as encoded frames such as voice frames, wherein each frame represents a portion of the analogue signal.

Degradations in the channel on which the information is sent will affect the information received at the receiver. Degradations in the channel can cause changes in the packet sequence, delay the arrival of some packets at the receiver and cause the loss of other packets. The degradations may be caused by channel imperfections, noise and overload in the channel. This ultimately results in a reduction of the quality of the signal output by the receiving terminal.

One type of communication network suitable for transmitting digital information is the internet. Protocols which are used to carry voice signals over an Internet Protocol network are commonly referred to as Voice over IP (VoIP). VoIP is the routing of voice conversations over the Internet or through any other IP-based network.

One example of a communication system to use VoIP is a peer to peer communication system, in which a plurality of end users can be connected for communication purposes via a communications structure such as the internet. A peer to peer network may also use other protocols to facilitate the transfer of other data such as text images or video. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

"Packet Voice Rate Adaptation through Perceptual Frame Discarding" by Steffen Praestholm et. al. discloses a method for discarding frames in an encoding system. The method disclosed makes use of an objective measure of speech quality (PESQ) to evaluate the effect of a discard. This is done be evaluating the objective difference according to this measure of the decoded frame and a packet loss concealment—replacement of this frame. The audio quality resulting from this method is limited by the limitations of the packet loss concealment method used. Further, the evaluation of each frame to identify which frames to discard is computational complex because of the closed loop evaluation of an objective measure of speech quality.

The prior art uses complex computational methods to achieve limited improvements in the quality of transmitted data. This increases processing overheads including hardware resources and processing time.

It is therefore an aim of the present invention to improve the perceived quality of the received signal. It is a further aim of the present invention to provide a method of improving the quality of the received signal without the use of complex computational methods.

SUMMARY

According to a first aspect of the present invention there is provided a method of transmitting data from a first node to a second node in a communication network comprising: receiving a signal; dividing the signal into data elements arranged in a first data stream comprising active and inactive data elements; analysing at least one characteristic of the signal to determine if the signal is stable; dropping at least one active data element from a plurality of data elements of the first data stream if it is determined that the portion of the signal included in the plurality of data elements is stable; inputting the data elements that are not dropped from the first data stream into a core stream; and transmitting the core stream from the first node to the second node.

According to a second aspect of the present invention there is provided a method of transmitting data from a first node to a second node in a communication network comprising: receiving a signal; dividing the signal into data elements arranged in a first data stream; analysing at least one parameter of the signal to determine if the signal is stable; dropping from the first data stream at least one data element if it is determined that the signal is stable; inserting an indicator in the first data stream at the position of the dropped data element indicating that the data element has been dropped, inputting the data elements that are not dropped from the first data stream and said indicator into a core stream; and transmitting the core stream from the first node to the second node.

According to a third aspect of the present invention there is provided a method of receiving data from a node in a communication network comprising the steps of: receiving a signal comprising a stream of data elements; detecting an indicator located in the stream of data elements; determining that a data element was dropped from the data stream at the location of the indicator; processing the stream of data elements based on the determination that a data element has been dropped; and outputting the processed stream of data elements.

According to a fourth aspect of the present invention there is provided a method of receiving a stream of data elements from a transmitting node in a communication network, wherein the transmitting node is arranged to drop a data element from the stream of data elements in accordance with predetermined conditions if it is determined that the stream of data elements is stable, said method comprising the steps of receiving the stream of data elements; analysing at least one characteristic of the stream of data elements to determine if the transmitting node would have determined the stream of data elements to be stable; reconstructing the dropped data element based on the predetermined conditions, if it is determined that the transmitting node would have determined the stream of data elements to be stable.

According to a fifth aspect of the present invention there is provided a transmitting device arranged to transmit data from a first node to a second node in a communication network comprising: means for receiving a signal; means for dividing the signal into data elements arranged in a first data stream; means for analysing at least one characteristic of the signal to determine if the signal is stable; means for dropping from the first data stream at least one data element if it is determined that the signal is stable; means for inserting an indicator in the first data stream at the position of the dropped data element indicating that the data element has been dropped, means for inputting the data elements that are not dropped from the first data stream and said indicator into a core stream; and means for transmitting the core stream from the first node to the second node.

According to a sixth aspect of the present invention there is provided a transmitting device arranged to transmit data from a first node to a second node in a communication network comprising: a receiver arranged to receive a signal; an encoder arranged to divide the signal into data elements arranged in a first data stream comprising active and inactive data elements, and to analyse at least one characteristic of the signal to determine if the signal is stable; a rate reducer module arranged to drop at least one active data element from a plurality of data elements of the first data stream if it is determined that the portion of the signal included in the plurality of data elements is stable and to input the data elements that are not dropped from the first data stream into a core stream; and a transmitter arranged to transmit the core stream from the first node to the second node.

According to a seventh aspect of the present invention there is provided a receiving device arranged to receive data from a transmitting device via a communication network comprising: means for receiving a stream of data elements; means for detecting an indicator located in the stream of data elements; and means for determining that a data element was dropped from the data stream at the location of the indicator; means for processing the stream of data elements based on the determination that a data element has been dropped; and means for outputting the processed stream of data elements.

According to an eighth aspect of the present invention there is provided receiving device arranged to receive a stream of data elements from a transmitting node in a communication network, wherein the transmitting node is arranged to drop a data element from the stream of data elements in accordance with predetermined conditions if it is determined that the stream of data elements is stable, said receiving device comprising: receiving means for receiving the stream of data elements; analysing means for analysing at least one characteristic of the stream of data elements to determine if the transmitting node would have determined the stream of data elements to be stable; and reconstructing means for reconstructing a dropped data element based on the predetermined conditions if it is determined that the transmitting node would have determined the stream of data elements to be stable.

According to a ninth aspect of the present invention there is provided a communication system comprising a first node arranged transmit data to a second node, wherein said first node comprises; means for inputting a signal; means for dividing the signal into data elements arranged in a first data stream comprising active and inactive data elements; means for analysing at least one characteristic of the signal to determine if the signal is stable; means for dropping at least one active data element from a plurality of data elements of the first data stream if it is determined that the portion of the signal included in the plurality of data elements is stable; means for inputting the data elements that are not dropped from the first data stream into a core stream; means for transmitting the core stream from the first node to the second node; and wherein the second node comprises receiving means for receiving the core stream.

According to a tenth aspect of the present invention there is provided a communication system comprising a first node arranged to transmit data to a second node, wherein the first node comprises: means for inputting a signal; means for dividing the signal into data elements arranged in a first data stream; means for analysing at least one characteristic of the signal to determine if the signal is stable; means for dropping from the first data stream at least one data element if it is determined that the signal is stable; means for inserting an indicator in the first data stream at the position of the dropped data element indicating that the data element has been dropped, means for inputting the data elements that are not dropped from the first data stream and said indicator into a core stream; means for transmitting the core stream from the first node to the second node; and wherein the second node comprises: means for receiving the core stream; means for detecting the indicator located in the core stream; and means for determining that the data element was dropped from the data stream at the location of the indicator; means for processing the stream of data elements in the core stream based on the determination that the data element has been dropped; and means for outputting the processed stream of data elements.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
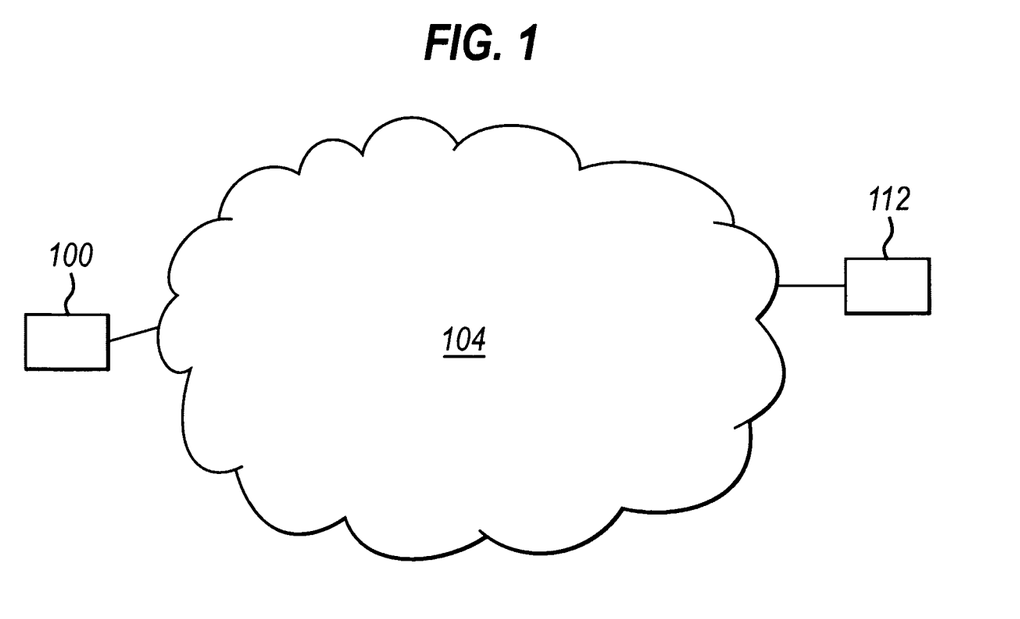
FIG. 1 shows two terminals connected to a communication network.

Reference will first be made to FIG. 1, in which is shown a source terminal 100 and a destination terminal 112 connected to a communication network 104. The source terminal is arranged to transmit data to the destination terminal 112 via the communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data. Embodiments of the invention are particularly suited to asynchronous communication networks such as frame based systems as ATM, BlueTooth and Enhanced Data rates for GSM Evolution (EDGE) networks.

The terminals 100 and 112 may be, for example, a personal computer, a gaming device, a personal digital assistant, a suitably enabled mobile phone, a television or other device able to connect to the network 104.

Figure 2:
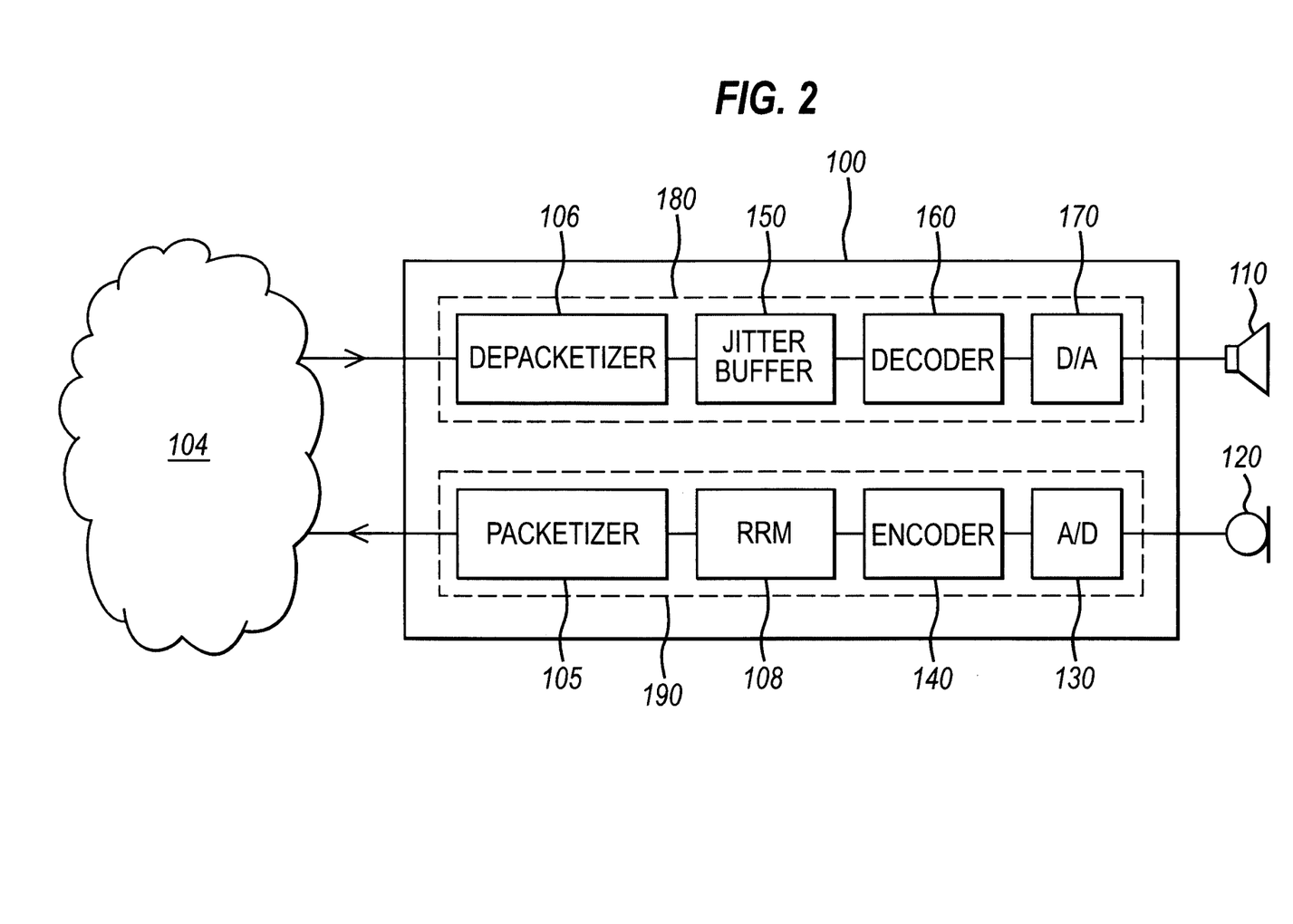
FIG. 2 shows a terminal connected to a network in accordance with an embodiment of the present invention.

FIG. 2 shows the source terminal 100 connected to the network 104. The terminal 100 has a user interface device to receive information from and output information to a user of the terminal. In a preferred embodiment of the invention the interface device of the terminal comprises a loudspeaker 110 and a microphone 120. The interface device may also comprise display means such as a screen and data entry means such as a keyboard, mouse or camera (not shown). The terminal 100 may be connected to the network 104 via a cable (wired) connection or a wireless connection.

The terminal 100 includes signal receiving circuitry 180 for receiving signals from the network 104 and signal transmitting circuitry 190 for transmitting signals to the destination terminal 112 via the network 104.

The signal receiving circuitry 180 includes a de-packetizer 106, a jitter buffer 150, a decoder 160 and a digital to analogue converter 170. Signal receiving circuitry is also provided in the destination terminal 112.

The depacketizer receives the packets from the network and removes the header from each packet before passing the data in the pay load of the packet to the jitter buffer. The jitter buffer 150 of the receiving circuitry buffers the data received from the de-packetizer 106. The data is buffered to introduce a delay before the data is output to the encoder, thereby allowing the data packets to be output continuously. The decoder 160 decodes the packets according to the encoding scheme used to encode the packets at the transmitter. The decoded digital signal output from the decoder 160 is then input into the analogue to digital converter 170 which converts the digital signal into an analogue signal. The analogue signal is then output to an output device such as a loudspeaker 110.

In accordance with an embodiment of the invention the signal transmitting circuitry 190 includes a packetizer 105, a rate reducer module (RRM) 108, an encoder 140 and an analogue to digital converter 130. In operation, analogue signals such as speech are input into the analogue to digital converter 130 from a microphone 120. The digital signals are then input into the encoder.

Figure 3:
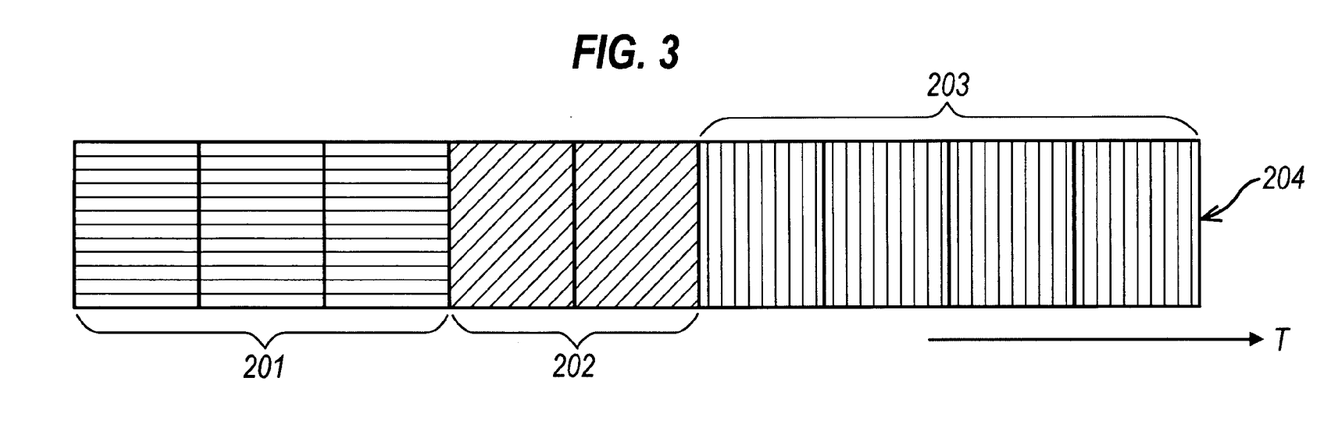
FIG. 3 shows data frames output from an encoder.

The encoder is arranged to group the bits in the bit stream of the digital signal into frames representing portions of the signal to be encoded. The frames are then encoded according to an encoding scheme implemented in the encoder. The encoded frames as shown in FIG. 3 are then input into the RMM 108.

The encoder 140 uses an encoding scheme that does not employ inter-frame encoding methods. One example of inter-frame encoding is a method of encoding that is effected by taking a difference between two frames and transmitting only the information of the difference between the frames. By using an encoding scheme that does not employ interframe encoding methods, in embodiments of the present invention it is possible to discard selected encoded frames without significantly affecting the perceived quality of the received signal.

According to an embodiment of the invention, characteristics of the signal are analyzed in order to determine the stability of the signal. If the signal is determined to be stable a selected frame may be removed before the signal is transmitted.

When the information in the signal relates to speech, an active frame may be defined as a frame that contains information containing voice activity. Conversely an inactive frame may be defined as a frame that contains periods of voice inactivity.

Active frames may be classified according to a phonetic classification that classifies an active frame as a stable voiced sound, a stable unvoiced sound, or an unstable transient sound. The usual pattern of speech includes periods of sound that are either stable sounds or unstable sounds. In phonetics, stable sounds may be grouped into stable voiced sounds and stable unvoiced sounds. For stable voiced sounds the vocal chords are vibrated. An example of a stable voiced sound is a vowel sound such as 'a' in the word 'bar'. For stable unvoiced sounds the vocal chords are not vibrated. An example of an stable unvoiced sound is the middle of an extended consonant sound such as 's' in the word 'signal'. Typically, a stable voiced sound such as 'a' has a higher energy than a stable unvoiced sound such as 's'. For all stable sounds the energy remains substantially constant during the pronunciation of the sound.

An unstable sound relates to speech onsets, plosives or the like, such as the 't' in the word target. Unstable sounds are also referred to as transient sounds. Typically, for unstable sounds the energy changes during the pronunciation of the sound.

According to embodiments of the invention when the signal is determined to be stable, only active frames containing stable voiced sounds or stable unvoiced sounds may be dropped. Inactive frames may also be dropped. However, active frames containing transient sounds cannot be dropped.

The stability of the signal may be determined in a variety of ways. The stability of the signal may be determined from a characteristic of the signal that is measured at any stage. For example the characteristic may be measured from the analogue data input into the transmitting circuitry, the digital data output from the analogue to digital converter, the data frames, the encoded data frames or from the data packets.

In one embodiment of the invention the characteristic measured may be the energy of the signal, the fundamental frequency of the signal or the spectral content of the signal. The signal may be determined to be stable if the measured characteristic remains constant within a predetermined range, or remains below a predetermined threshold for a predetermined period.

Alternatively the stability may be determined from analyzing the difference between the signal qualities over time. For example the squared error distance between the fundamental frequencies of the signal may be measured. These may be measured for each frame, or for each nth frame. Alternatively the numbers of bits used for encoding each frame may be employed to determine the stability. The number of bits may be measured for each frame, or for each nth frame. The signal stability may then be determined by comparing the squared error distance between frames to a predetermined threshold.

The stability of the signal may also be determined from the speech information that is contained in the signal.

The signal may be determined to be stable if it includes periods of stable unvoiced sound or periods of stable voiced sound. Accordingly if consecutive frames include voiced data a frame may be dropped. Similarly if consecutive frames include unvoiced data a frame may be dropped.

The signal parameters that may classify a frame as containing a stable voiced sound, stable unvoiced sound or an unstable transient sound include the energy, the fundamental frequency and the spectral content of the signal information in the frame. This list is an example of the parameters that may classify the frame and is not exhaustive.

According to one embodiment of the invention the encoder 140 analyzes the signal parameters of each frame before it is encoded and classifies each frame as either a voiced frame, an unvoiced frame or a transient frame.

The encoded frames are input into the RRM 108, before being output to the packetizer 105 where the frames are inserted into the payload of data packets before being transmitted to a destination terminal via the network 104.

FIG. 3 shows a stream of encoded frames 204 that are input into the RRM from the encoder. The encoded frames 204 comprise encoded unvoiced frames 201, encoded transient frames 202 and encoded voiced frames 203.

The devisors of the present invention have identified that some frames may be dropped before the signal is transmitted to the receiving device without significantly altering the perceived quality of the received signal.

According to an embodiment of the invention the rate reducer module (RRM) is provided to select frames or packets that may be dropped from the transmission based on the stability of the signal.

Figure 4:
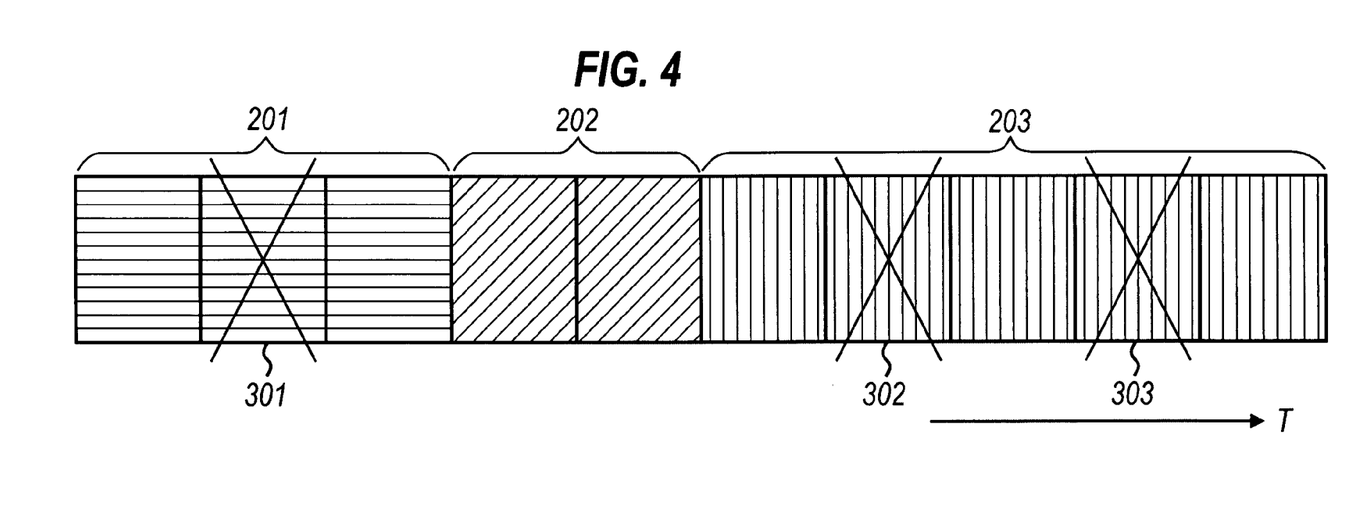
FIG. 4 shows data frames that have been dropped in accordance with an embodiment of the present invention.

The operation of the rate reducer module will now be described in detail with reference to FIGS. 3 and 4.

According to an embodiment of the invention the RRM 108 selects frames that are to be dropped based on information from which the stability of the signal may be determined. In one embodiment of the invention this information may be provided by the encoder. The encoder provides the RRM with information on the data in each frame. This information may relate to the frame energy, the fundamental frequency, the phonetic classification of the data frame or any other characteristic of the signal that allows the stability of the signal to be assessed, examples of which are described above.

In one embodiment of the invention the encoder may provide information on a plurality of parameters for each frame. For example the frame classification may be provided together with the fundamental frequency of the frame.

In one embodiment of the invention the RRM only drops unvoiced, voiced, or inactive frames, since dropping any transient frames will have a detrimental effect on the signal quality. The RRM may also be arranged to not drop a frame that occurs next to a transient packet.

FIG. 3 is a stream of encoded frames 204 illustrating which encoded frames will be dropped. FIG. 3 shows that the RRM 108 has selected unvoiced encoded frame 301 and voiced encoded frames 302 and 303 to be dropped from the stream of encoded frames 204.

According to the embodiment illustrated in FIG. 3 the RRM is arranged to drop a frame if the surrounding frames are classified as the same data type. As shown in FIG. 3, dropped unvoiced frame 301 has an unvoiced frame before it and an unvoiced frame after it. Similarly dropped voiced frames 302 and 303 each have voiced frames before and after them in the stream of encoded frames.

In one embodiment of the invention the condition for dropping a frame may be adapted in response to the conditions of the communication network. For example the number of frames that the signal should remain stable for may be reduced if the conditions of the communication network are good.

In an alternative embodiment of the invention additional conditions may be applied to the selection of a frame to be dropped. In addition to the requirement that the surrounding frames are classified as the same type as the frame to be dropped, it may also be required that the surrounding frames have a further parameter that appears constant. For example it may also be required that the fundamental frequency is constant or within a predetermined range.

Figure 6:
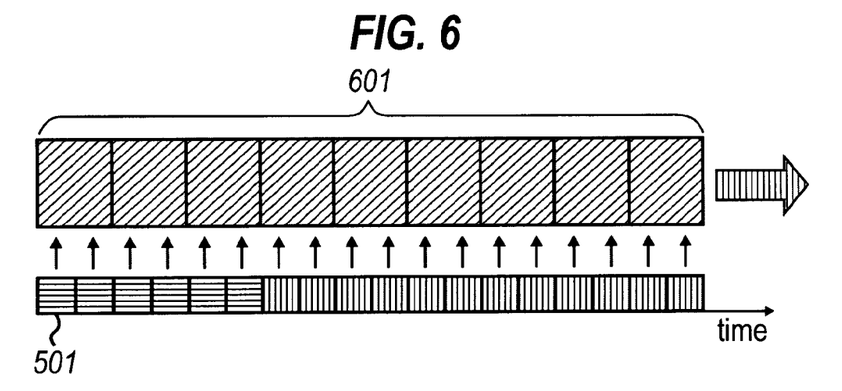
FIG. 6 shows how data frames are inserted into packets according to an embodiment of the present invention.

The frames that are not dropped from the stream of encoded frames 204 are placed in a core stream that is input into the packetizer 105. As shown in FIG. 6, the packetizer 105 inserts the frames into the payloads of packets 601 before the packets are transmitted across the network 104. In a preferred embodiment of the invention, two frames are inserted into the payload of each packet.

The devisors of the invention have found that the in practice, by using the method to drop packets as described above, the average data rate in the core stream is 40-45% less than the data rate of the data stream 204 input into the RRM 204.

In one embodiment of the invention frames that are dropped are replaced using one bit to represent each dropped frame in the payload of the packet. According to this embodiment of the invention the RRM is arranged to insert a bit into the payload of a packet at the position of a dropped frame when the frame is dropped.

According to this embodiment of the invention, the decoder 160 in the receiving circuitry of the destination terminal 112 is arranged to detect the bit included in the payload of the packet and to determine that the bit represents a frame that was dropped before the packet was transmitted. Accordingly, when the packet is received at the destination terminal 112, the receiver can immediately determine that the frame was dropped from the payload. In knowing that the packet was intentionally dropped, the receiver can make a better reconstruction of the dropped packet. For example, the presence of a bit indicates to the receiver that the frame was dropped because the signal was determined to be stable. This allows the receiver to reconstruct the dropped frame knowing that the frame to be reconstructed will result in a stable signal. Also, according to one embodiment of the present invention when the receiver receives a bit in place of a dropped packet the receiver will not attempt to compensate for the dropped frame using techniques such as signal attenuation or bandwidth expansion of synthesis filter coefficients.

Furthermore, transmitting one bit in place of the dropped frame allows the receiver to use the received packets for establishing transmission statistics to determine the channel quality.

According to an embodiment of the invention the dropped frame is reconstructed by the decoder.

Transmitting a bit in place of a dropped frame, at the position of the dropped frame, also allows the receiver to determine the correct time stamp for each frame included in the payload of the packet and for the reconstructed frame. Accordingly instead of transmitting a time stamp for each frame included in the packet the transmitting circuitry is only required to transmit one timestamp for the packet.

In an alternative embodiment of the invention a bit is not transmitted in the payload of a packet to represent a dropped frame. In this embodiment of the invention the decoder is aware of the specific conditions employed in the RRM to drop a frame.

The decoder analyses the information in the received signal from which the stability of the signal may be determined. This information may relate to the frame energy, the fundamental frequency, the phonetic classification of the data frame or any other characteristic of the signal that allows the stability of the signal to be assessed. Since the decoder is aware of the conditions employed by the RRM to drop a frame, the decoder may determine from the stability of the received signal which frames were dropped by the encoder. For example the decoder may know that for periods of voice inactivity every nth frame may have been dropped. The decoder may then recreate the dropped frames knowing the conditions for dropping a frame at the transmitter.

In one embodiment of the invention the data packets dropped from the data stream 204 are discarded by the RRM.

Figure 5:
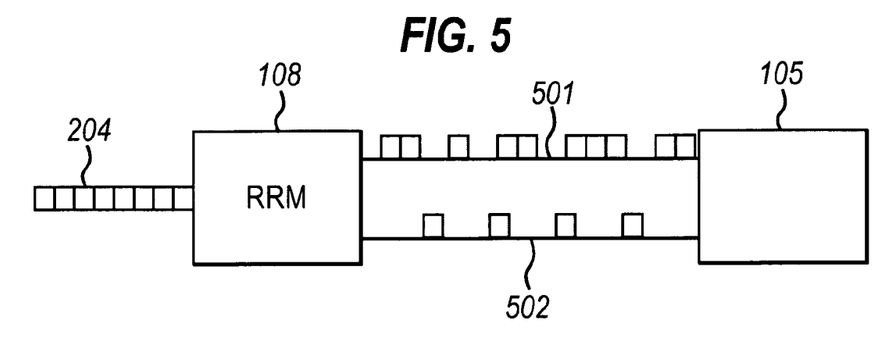
FIG. 5 shows a core stream and a secondary stream transmitted between a rate reducer module and a packetizer in accordance with an embodiment of the present invention.

Reference will now be made to FIG. 5 which shows an alternative embodiment of the present invention wherein the RRM 108 is arranged to selectively transmit at least some of the frames dropped from the data stream 204. As shown in FIG. 5, a core stream 501 containing the frames that have not been dropped from the data stream 204 by the RRM 108 is input into the packetizer 105. A secondary data stream 502 containing the data frames dropped from the data stream 204 that the RRM has decided to transmit is also input into the packetizer 105. The decision to input the dropped frames into the packetizer 105 in the secondary data stream 502 may be dependent on the conditions of the communication system. According to one embodiment of the invention the RRM may be arranged to detect the bandwidth of the network connection and to transmit the secondary stream if the available bandwidth is above a threshold. In a further embodiment of the invention the RRM may decide to transmit the dropped frames based on information determined from the received data channel from the destination. This information may include information on packet loss and jitter.

The frames in the core data stream and the secondary data stream arrive at the packetizer in the order they were arranged in the data stream 204.

In one embodiment of the invention the frames are inserted into the packet of a payload in the order that they are received, irrespective of whether the frame was received in the core data stream or the secondary data stream 502. In this embodiment of the invention the payload of a packet may include frames from the core stream and frames from the secondary stream.

Figure 7:
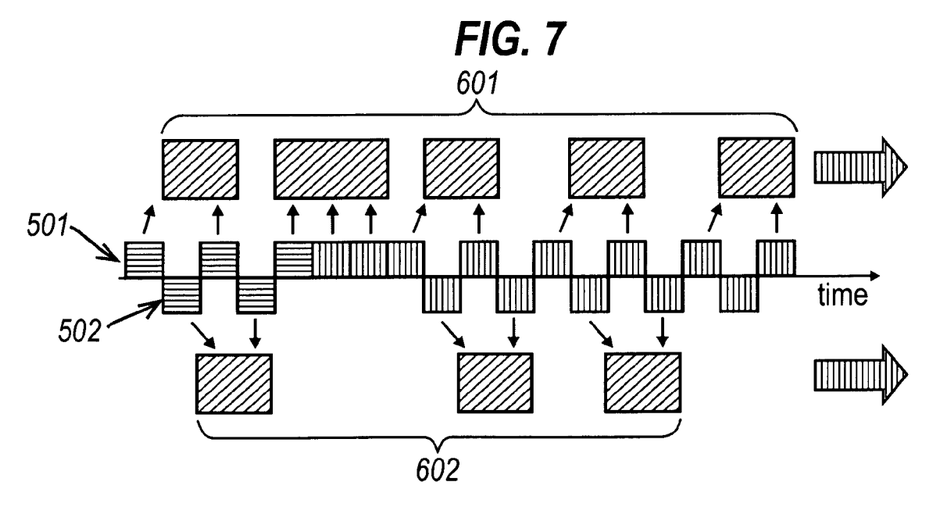
FIG. 7 shows how data frames are inserted into packets according to an alternative embodiment of the present invention.

FIG. 7 shows an alternative embodiment of the invention wherein the frames input into the packetizer in the core stream 501 are input into the payload of packets 601 and frames input into the packetizer on the secondary stream 502 are inserted into the payload of packets 602. In this embodiment a packet may contain either frames from the core stream 501 or frames from the secondary stream 502.

Forward error correction (FEC) methods may be used to protect the transmitted data. In one embodiment of the invention greater FEC may be applied to packets containing frames from the core stream than to packets containing frames from the secondary stream. For example the packets that contain frames from the core stream may be transmitted twice.

In another embodiment of the invention the packets containing frames from the core stream may be transmitted on a separate channel in the communications network to the packets containing frames from the secondary stream.

In an embodiment of the invention, when the frames from the core stream are transmitted in packets separately from the frames from the secondary stream the packet header provides information on the order of each frame contained in its payload. This information allows the receiver at the destination terminal 112 to reorder the frames in the order they were arranged in the data stream 204 output from the encoder 140.

The information indicating the order may be a "timestamp", indicating when the frames were input into the packetizer 105.

In an alternative embodiment of the invention the encoder does not analyze the parameters of the frames. Instead the RRM 108 is arranged to partially decode the frames to determine the parameters of the frame in order to select a frame to drop from the transmission.

In an alternative embodiment of the invention the RRM analyze the number of bits used to encode a frame. If the number of bits used to encode the frame is below a predetermined threshold the frame may be discarded. Alternatively if the number of bits is within a predetermined range the frame may be discarded. For example, frames encoded with a number of bits within the range 63-94 may be recognized as belonging to a particular type of data, (e.g. noise), that may be discarded.

In a further alternative embodiment of the invention the RRM is arranged upstream of the encoder. In this embodiment the RMM may analyze each frame before it is encoded. The selected frames may be dropped before the frames intended for transmission are encoded.

In an alternative embodiment of the invention the RRM may form part of the encoder.

In an alternative embodiment of the invention, the signal parameters are measured before the data is divided into frames. The RRM may determine that a frame may be dropped from a portion of a signal, if that portion of the signal is determined to be stable based on the measured signal parameters.

In one embodiment of the invention the network 104 is a peer to peer network.

In a further alternative of the invention the RRM may be located at the node in the peer to peer network 104. The node may be a forwarding terminal such as a PC that is arranged to forward the signal from the source terminal to the destination terminal. When the forwarding terminal transmits the signal towards the destination terminal the RRM located at the forwarding terminal analyzes a parameter in at least some of the frames in the signal and drops selected frames from the transmission. Since the frames are not encoded at the forwarding terminal in this embodiment of the invention it is necessary for the RRM of the forwarding terminal to partially decode the frames to determine the signal parameters.

In a further alternative embodiment of the invention the RRM is placed between the packetizer and the network. In this embodiment of the invention the RRM is arranged to drop frames from the payload of the packet. If all the frames in the payload of a packet are dropped the packet is dropped.

In an alternative embodiment of the invention the source terminal and the destination terminal may be arranged to transmit and receive video data. In this embodiment of the invention the RRM drops video frames that are classified as stable in the same manner as described in relation to audio frames. The stability of a video frame may be assessed based on the variation of motion vectors, or correlation based metrics. These techniques are known in the art and will not be described further herein.

In a further alternative embodiment of the invention frames containing silent sounds, otherwise referred to as silent frames may be dropped either before the frames are encoded, or before the frames are input into the RRM. A silent frame may be determined by a voice activity detector according to a known method.

While this invention has been particularly shown and described with reference to preferred embodiments, it will be understood to those skilled in the art that various changes in form and detail may be made without departing from the scope of the invention as defined by the claims.

What is claimed is:

1. A method comprising:
   receiving a signal;
   dividing the signal into data elements arranged in a first data stream comprising active and inactive data elements;
   analysing at least one characteristic of the signal to determine if the signal is stable over a plurality of data elements;
   classifying the active data elements as containing one of a stable voiced sound, a stable unvoiced sound, or an unstable transient sound;
   selecting at least one active data element to be dropped from the plurality of data elements of the first data stream if it is determined that the signal is stable over the plurality of data elements, the at least one active data element to be dropped selected from active data elements that are classified as containing either the stable voiced sound or the stable unvoiced sound but excluding active data elements that are classified as containing the unstable transient sound;
   dropping the selected at least one active data element;
   inputting frames of the data elements that are not dropped from the first data stream into packets of a core stream; and
   transmitting the core stream from a first node to a second node via a communication network.

2. A method as claimed in claim 1 wherein the characteristic of the signal indicates a data type of the data element.

3. A method as claimed in claim 2 wherein the data type is either voiced, unvoiced, transient or silent data.

4. A method as claimed in claim 3 wherein the data type of the active data elements is one of voiced, unvoiced, or transient.

5. A method as claimed in claim 4 wherein a first voiced data element is dropped if it is preceded by a second voiced data element in the data stream.

6. A method as claimed in claim 5 wherein the first voiced data element is only dropped if it is also followed by a third voiced data element in the data stream.

7. A method as claimed in claim 4 wherein a first unvoiced data element is dropped if it is preceded by a second unvoiced data element in the data stream.

8. A method as claimed in claim 7 wherein the unvoiced data element is only dropped if it is also followed by a third unvoiced data element in the data stream.

9. A method as claimed in claim 3 wherein the data type of the inactive data elements is silent.

10. A method as claimed in claim 1 wherein the characteristic of the signal indicates whether the data element is stable or unstable.

11. A method as claimed in claim 10 wherein a first stable data element is dropped if it is preceded by a second stable data element in the data stream.

12. A method as claimed in claim 11 wherein the first stable data element is only dropped if it is also followed by a third stable data element in the data stream.

13. A method as claimed in claim 10 wherein only stable data elements are dropped.

14. A method as claimed in claim 1 further comprising:
   determining transmission conditions of the communication network;
   inputting data elements dropped from the first data stream into a secondary data stream if the transmission conditions of the communication network satisfy a predetermined threshold; and
   transmitting the data elements in the secondary data stream.

15. A method as claimed in claim 14 wherein a payload of a packet is used to transmit the data elements from the core stream and from the secondary stream.

16. A method as claimed in claim 14 wherein data elements from the core stream and data elements from the secondary stream are transmitted in separate packets.

17. A method as claimed in claim 1 wherein the characteristic of the signal indicates whether the data element is active or inactive.

18. A method as claimed in claim 1 wherein the signal is determined to be stable over the plurality of data elements if the characteristic remains constant.

19. A method as claimed in claim 1 wherein the signal is determined to be stable over the plurality of data elements if the characteristic remains within a predefined range.

20. A method as claimed in claim 1 wherein the characteristic of the signal is analysed for each consecutive data element.

21. A method as claimed in claim 1 wherein the characteristic of the signal is analysed for every nth data element.

22. A method as claimed in claim 1 wherein the characteristic of the signal analysed for each data element is different.

23. A method as claimed in claim 1 wherein the signal is determined to be stable if the plurality of data elements are of a same data type.

24. A method as claimed in claim 1 wherein the data element is dropped if it is encoded using a number of bits that are below a predetermined threshold.

25. A method as claimed in claim 1 wherein each of the packets of the core stream includes a header containing information indicating an order that each data element was arranged in the first data stream.

26. A method as claimed in claim 1 wherein a bit is inserted into a payload of each of the packets of the core stream to indicate the dropped data element.

27. A method as claimed in claim 1 wherein the characteristic analysed is at least one of an energy of the signal, a frequency of the signal, a spectral content of the signal, a spectral envelope of the signal, or a number of encoded bits of the signal.

28. A method as claimed in claim 1 wherein more than one characteristic of the signal is analysed to determine if a portion of the signal is stable over the plurality of data elements.

29. A method as claimed in claim 1 wherein the characteristic of the signal is analysed when voice activity is detected on the signal.

30. A method comprising:
   receiving a signal comprising a stream of data elements;
   detecting an indicator located in the stream of data elements;
   determining that a stable data element was dropped from the data stream at a location of the indicator, the stable data element that was dropped including either a stable voiced sound or stable unvoiced sound but not including an unstable transient sound;
   processing the stream of data elements based on the determination that a stable data element has been dropped; and
   outputting the processed stream of data elements.

31. A method as claimed in claim 30 wherein the stream of data elements is processed by reconstructing the stable data element that was dropped at the location of the indicator.

32. A method as claimed in claim 31 wherein the reconstructed data element is reconstructed such that a portion of the signal comprising the reconstructed data element is stable.

33. A method as claimed in claim 30 wherein the data elements of the data stream are received in data packets.

34. A method as claimed in claim 33 wherein a time at which each data element was produced is determined from a time stamp associated with each data packet.

35. A method as claimed in claim 30 wherein a time at which the dropped data element was transmitted is determined from the location of the indicator of the data stream.

36. A method executing on a hardware computer, the method for transmitting data from a first node to a second node in a communication network comprising:
receiving a signal;
dividing the signal into data elements arranged in a first data stream;
analysing at least one parameter of the signal to determine if the signal is stable;
dropping from the first data stream at least one data element if it is determined that the signal is stable, the dropped data element containing a stable voiced sound or a stable unvoiced sound but not containing an unstable transient sound;
inserting an indicator in the first data stream at the position of the dropped data element indicating that the data element has been dropped,
inputting the data elements that are not dropped from the first data stream and said indicator into a core stream; and
transmitting the core stream from the first node to the second node.

37. A method as claimed in claim 36 wherein the indicator is a bit.

38. A method as claimed in claim 36 wherein the data is audio data.

39. A method as claimed in claim 36 wherein the data is video data.

40. A method executing on a hardware computer, the method for receiving a stream of data elements from a transmitting node in a communication network, wherein the transmitting node is configured to drop a data element from the stream of data elements based on one or more predetermined conditions if it is determined that the stream of data elements is stable, said method comprising:
receiving the stream of data elements;
analysing at least one characteristic of the stream of data elements to determine if the transmitting node would have determined the stream of data elements to be stable;
reconstructing the dropped data element based on the predetermined conditions if it is determined that the transmitting node would have determined the stream of data elements to be stable, the dropped data element containing a stable voiced sound or a stable unvoiced sound but not containing an unstable transient sound.

41. A method comprising:
receiving a signal comprising a data stream of active and inactive data elements;
analysing at least one characteristic of the signal to determine if the signal is stable;
dropping at least one active data element from a plurality of data elements of the first data stream if it is determined that the portion of the signal included in the plurality of data elements is stable, the dropped active data element selected from active data elements that contain either a stable voiced sound or a stable unvoiced sound but excluding active data elements that contain an unstable transient sound;
inputting the data elements that are not dropped from the first data stream into a core stream; and
transmitting the core stream from a first node to a second node.

42. A method comprising:
receiving a signal;
dividing the signal into data elements arranged in a first data stream comprising voiced and unvoiced data elements;
analysing at least one parameter of the signal to determine if the signal is stable;
encoding each data element according to an encoding scheme;
dropping at least one voiced or unvoiced data element from a plurality of data elements of the first data stream if it is determined that the portion of the signal included in the plurality of data elements is stable, wherein data elements that contain an unstable transient sound are not dropped from the plurality of data elements of the first data stream;
inputting the data elements that are not dropped from the first data stream into a core stream; and
transmitting the core stream from the first node to the second node.

43. A computing device configured to transmit data from a first node to a second node in a communication network, the computing device comprising:
means for receiving a signal;
means for dividing the signal into data elements arranged in a first data stream comprising active and inactive data elements;
means for analysing at least one characteristic of the signal to determine if the signal is stable;
means for dropping at least one active data element from a plurality of data elements of the first data stream if it is determined that the portion of the signal included in the plurality of data elements is stable, the dropped data element selected from active data elements that contain either a stable voiced sound or a stable unvoiced sound but excluding active data elements that contain an unstable transient sound;
means for inputting the data elements that are not dropped from the first data stream into a core stream; and
means for transmitting the core stream from the first node to the second node.

44. A computing device configured to transmit data from a first node to a second node in a communication network, the computing device comprising:
means for receiving a signal;
means for dividing the signal into data elements arranged in a first data stream;
means for analysing at least one characteristic of the signal to determine if the signal is stable;
means for dropping from the first data stream at least one data element if it is determined that the signal is stable, the dropped data element selected from active data elements that contain either a stable voiced sound or a stable unvoiced sound but excluding active data elements that contain an unstable transient sound;
means for inserting an indicator in the first data stream at the position of the dropped data element indicating that the data element has been dropped, means for inputting the data elements that are not dropped from the first data stream and said indicator into a core stream; and
means for transmitting the core stream from the first node to the second node.

45. A computing device configured to transmit audio data from a first node to a second node in a communication network, the computing device comprising:
a receiver configured to receive a signal;
an encoder configured to divide the signal into data elements arranged in a first data stream comprising active and inactive data elements, and to analyse at least one characteristic of the signal to determine if the signal is stable over a plurality of data elements, the encoder classifying the active data elements as containing one of a stable voiced sound, a stable unvoiced sound, or an unstable transient sound;
a rate reducer module configured to select at least one active data element to be dropped from the plurality of data elements of the first data stream if it is determined that the signal is stable over a plurality of data elements, the at least one active data element to be dropped selected from active data elements that are classified as containing either the stable voiced sound or the stable unvoiced sound but excluding active data elements that are classified as containing the unstable transient sound, the rate reducer module further configured to drop the selected at least one data element, and to input the data elements that are not dropped from the first data stream into a core stream; and
a transmitter configured to transmit the core stream from the first node to the second node.

46. A computing device configured to transmit data from a first node to a second node in a communication network, the computing device comprising:
a receiver configured to receive a signal;
an encoder configured to divide the signal into data elements arranged in a first data stream, and to analyse at least one characteristic of the signal to determine if the signal is stable;
a rate reducer module configured to drop from the first data stream at least one data element if it is determined that the signal is stable, to insert an indicator in the first data stream at the position of the dropped data element indicating that the data element has been dropped, and to input the data elements that are not dropped from the first data stream and said indicator into a core stream, the dropped data element selected from active data elements that contain either a stable voiced sound or a stable unvoiced sound but excluding active data elements that contain an unstable transient sound; and
a transmitter configured to transmit the core stream from the first node to the second node.

47. A computing device configured to receive data from a transmitting device via a communication network, the computing device comprising:
means for receiving a stream of data elements;
means for detecting an indicator located in the stream of data elements;
means for determining that a stable data element was dropped from the data stream at the location of the indicator, the stable data element that was dropped including either a stable voiced sound or stable unvoiced sound but not including an unstable transient sound;
means for processing the stream of data elements based on the determination that a stable data element has been dropped; and
means for outputting the processed stream of data elements.

48. A computing device configured to receive a stream of data elements from a transmitting node in a communication network, wherein the transmitting node is configured to drop a data element from the stream of data elements in accordance with predetermined conditions if it is determined that the stream of data elements is stable, said computing device comprising:
receiving means for receiving the stream of data elements;
analysing means for analysing at least one characteristic of the stream of data elements to determine if the transmitting node would have determined the stream of data elements to be stable; and
reconstructing means for reconstructing a dropped data element based on the predetermined conditions if it is determined that the transmitting node would have determined the stream of data elements to be stable, the dropped data element including either a stable voiced sound or stable unvoiced sound but not including an unstable transient sound.

49. A computing device configured to receive data from a transmitting device via a communication network, the computing device comprising:
a receiver configured to receive a stream of data elements;
a decoder configured to detect an indicator located in the stream of data elements, to determine that a stable data element was dropped from the data stream at the location of the indicator, and to process the stream of data elements based on the determination that the stable data element was dropped, the stable data element that was dropped including either a stable voiced sound or stable unvoiced sound but not including an unstable transient sound; and
an interface configured to output the processed stream of data elements.

50. A computing device configured to receive a stream of data elements from a transmitting node in a communication network, wherein the transmitting node is configured to drop a data element from the stream of data elements in accordance with predetermined conditions if it is determined that the stream of data elements is stable, said computing device comprising:
a receiver configured to receive the stream of data elements; and
a decoder configured to analyse at least one characteristic of the stream of data elements to determine if the transmitting node would have determined the stream of data elements to be stable, and to reconstruct the dropped data element based on the predetermined conditions if it is determined that the transmitting node would have determined the stream of data elements to be stable, the dropped data element including either a stable voiced sound or stable unvoiced sound but not including an unstable transient sound.

51. A communication system comprising a first node configured to transmit data to a second node, wherein said first node comprises;
means for inputting a signal;
means for dividing the signal into data elements arranged in a first data stream comprising active and inactive data elements;
means for analysing at least one characteristic of the signal to determine if the signal is stable;
means for dropping at least one active data element from a plurality of data elements of the first data stream if it is determined that the portion of the signal included in the plurality of data elements is stable, the dropped active data element selected from active data elements that contain either a stable voiced sound or a stable unvoiced sound but excluding active data elements that contain an unstable transient sound;

means for inputting the data elements that are not dropped from the first data stream into a core stream; and means for transmitting the core stream from the first node to the second node.

52. A communication system comprising a first node configured to transmit data to a second node, wherein the first node comprises:

means for inputting a signal;

means for dividing the signal into data elements arranged in a first data stream;

means for analysing at least one characteristic of the signal to determine if the signal is stable;

means for dropping from the first data stream at least one data element if it is determined that the signal is stable, the dropped data element selected from active data elements that contain either a stable voiced sound or a stable unvoiced sound but excluding active data elements that contain an unstable transient sound;

means for inserting an indicator in the first data stream at the position of the dropped data element indicating that the data element has been dropped, means for inputting the data elements that are not dropped from the first data stream and said indicator into a core stream; and means for transmitting the core stream from the first node to the second node.

53. A communication system comprising a first node configured to transmit data to a second node, wherein said first node comprises;

a receiver configured to receive a signal;

an encoder configured to divide the signal into data elements arranged in a first data stream comprising active and inactive data elements and to analyse at least one characteristic of the signal to determine if the signal is stable;

a rate reducer module configured to drop at least one active data element from a plurality of data elements of the first data stream if it is determined that the portion of the signal included in the plurality of data elements is stable, and to input the data elements that are not dropped from the first data stream into a core stream, the dropped data element selected from active data elements that contain either a stable voiced sound or a stable unvoiced sound but excluding active data elements that contain an unstable transient sound; and a transmitter configured to transmit the core stream from the first node to the second node.

54. A communication system comprising a first node configured to transmit data to a second node, wherein the first node comprises:

a receiver arranged to receive a signal;

an encoder configured to divide the signal into data elements arranged in a first data stream, and to analyse at least one characteristic of the signal to determine if the signal is stable;

a rate reducer module configured to drop from the first data stream at least one data element if it is determined that the signal is stable, to insert an indicator in the first data stream at the position of the dropped data element indicating that the data element has been dropped, and to input the data elements that are not dropped from the first data stream and said indicator into a core stream, the dropped data element selected from active data elements that contain either a stable voiced sound or a stable unvoiced sound but excluding active data elements that contain an unstable transient sound; and a transmitter configured to transmit the core stream from the first node to the second node.

* * * * *